(12) United States Patent
Ichinokawa (10) Patent No.: US 9,026,348 B2
(45) Date of Patent: May 5, 2015

(54) SYSTEM AND METHOD FOR BRAKE COACHING

(71) Applicant: Honda Motor Co., Ltd., Minato-Ku, Tokyo (JP)

(72) Inventor: Jumpei Ichinokawa, Rolling Hills Estates, CA (US)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 230 days.

(21) Appl. No.: 13/724,285

(22) Filed: Dec. 21, 2012

(65) Prior Publication Data

US 2014/0180564 A1 Jun. 26, 2014

(51) Int. Cl.
G06F 19/00 (2011.01)
B60W 50/14 (2012.01)
B60K 35/00 (2006.01)

(52) U.S. Cl.
CPC ............ B60W 50/14 (2013.01); B60K 35/00 (2013.01); *B60K 2350/1092* (2013.01); *B60W 2050/146* (2013.01); *B60W 2520/04* (2013.01); *B60W 2520/10* (2013.01); *B60W 2530/18* (2013.01); *B60W 2540/10* (2013.01)

(58) Field of Classification Search
USPC .................................. 701/78, 79, 93, 96, 123
See application file for complete search history.

(56) References Cited

U.S. PATENT DOCUMENTS

| | | | |
|---|---|---|---|
| 4,617,627 A | 10/1986 | Yasunobu et al. | |
| 5,794,170 A | 8/1998 | Kuroda et al. | |
| 5,839,990 A | 11/1998 | Virkkala | |
| 6,092,021 A | 7/2000 | Ehlbeck et al. | |
| 6,223,118 B1 | 4/2001 | Kobayashi et al. | |
| 6,805,326 B1 | 10/2004 | Baier | |
| 6,957,138 B2 | 10/2005 | Kondo et al. | |
| 7,130,766 B2 | 10/2006 | Tanase | |
| 7,383,115 B2 | 6/2008 | Tabata et al. | |
| 7,400,964 B2 | 7/2008 | Shiiba et al. | |
| 7,427,254 B2 | 9/2008 | Iwatsuki et al. | |
| 7,454,962 B2 | 11/2008 | Nishiyama et al. | |
| 7,469,178 B2 | 12/2008 | Shiiba et al. | |

(Continued)

FOREIGN PATENT DOCUMENTS

| | | |
|---|---|---|
| EP | 2332784 | 6/2011 |
| JP | 11188423 | 7/1999 |

(Continued)

OTHER PUBLICATIONS

Goodwin, Antuan, "PLX Kiwi Review", CNET Magazine at CNET.com, review date Aug. 18, 2008 [online] [retrieved on Jan. 8, 2015], 6 pages. Retrieved from <URL: http://cnet.com/products/plx-kiwi/>.

(Continued)

*Primary Examiner* — Kim T Nguyen
(74) *Attorney, Agent, or Firm* — Quarles & Brady LLP (57) ABSTRACT

A system and method of providing feedback to an operator of a vehicle is presented. A release of an accelerator pedal of the vehicle is detected and a distance traveled by the vehicle between the time the release of the accelerator pedal is detected and the vehicle reaches a stop is measured. The distance traveled and a speed of the vehicle at the time the release of the accelerator pedal is detected is determined to calculate a point score. After the point score is calculated, the point score is displayed for review by the operator of the vehicle.

20 Claims, 6 Drawing Sheets

(56) References Cited

U.S. PATENT DOCUMENTS

| | | |
|---|---|---|
| 7,502,679 B2 | 3/2009 | Tabata et al. |
| 7,734,404 B2 | 6/2010 | Shiiba et al. |
| 7,756,602 B2 | 7/2010 | Koempel et al. |
| 7,848,867 B2 | 12/2010 | Ueno |
| 7,865,276 B2 | 1/2011 | Skaff et al. |
| 8,009,026 B2 | 8/2011 | Giuli |
| 8,116,971 B2 | 2/2012 | Chen et al. |
| 8,190,325 B2 | 5/2012 | Crombez |
| 2007/0143002 A1 | 6/2007 | Crowell et al. |
| 2007/0213920 A1* | 9/2007 | Igarashi et al. ............ 701/114 |
| 2009/0062987 A1 | 3/2009 | Kim et al. |
| 2009/0326753 A1 | 12/2009 | Chen et al. |
| 2010/0152988 A1 | 6/2010 | Olofsson |
| 2010/0228459 A1 | 9/2010 | Mizuno et al. |
| 2010/0256848 A1 | 10/2010 | Sasaki et al. |
| 2010/0262408 A1 | 10/2010 | Taguchi et al. |
| 2011/0054768 A1 | 3/2011 | Sullivan |
| 2011/0087390 A1 | 4/2011 | Pandit et al. |
| 2011/0133921 A1 | 6/2011 | Harumoto et al. |
| 2011/0153178 A1 | 6/2011 | Westendorf |
| 2011/0205043 A1 | 8/2011 | Fujiki et al. |
| 2011/0241861 A1 | 10/2011 | Levy et al. |
| 2011/0241864 A1 | 10/2011 | Fujiki et al. |
| 2011/0251752 A1 | 10/2011 | DeLarocheliere et al. |
| 2012/0245837 A1* | 9/2012 | Lee et al. ................. 701/123 |
| 2012/0256848 A1 | 10/2012 | Srinivasan et al. |

FOREIGN PATENT DOCUMENTS

| | | |
|---|---|---|
| JP | 2002370560 | 12/2002 |
| JP | 2007221889 | 8/2007 |
| JP | 2010064576 | 3/2010 |
| JP | 2011137443 | 7/2011 |

OTHER PUBLICATIONS

Niquette, Paul, "To Brake or Not to Brake Solution", from Niquette.com website [online] [retrieved on Jan. 8, 2015], 6 pages. Retrieved from <URL: http://www.niquette.com/puzzles/coasts.htm>.

Webster, Andrew, "Buick Developed Mobile Games Promote Fuel Efficiency", from PCMag.com website dated Jan. 30, 2012 [online] [retrieved on Jan. 9, 2015], 1 page. Retrieved from <http://goodcleantech.pcmag.com/automotive/293497-buick-developed-mobile-games-promote-fuel-efficiency>.

"Energy-efficient Driving", Wikipedia [online] [retrieved on Jan. 8, 2015], 14 pages. Retrieved from <URL: https://web.archive.org/web/20121111233753/http://en.wikipedia.org/wiki/Energy-efficient_driving>.

* cited by examiner

SYSTEM AND METHOD FOR BRAKE COACHING

FIELD

The disclosure relates in general to a feedback system and method for a vehicle operator and, more particularly, to a vehicle user interface providing vehicle operator feedback to assist in developing and maintaining energy-efficient braking habits.

BACKGROUND

Although many technological advances have been made to improve the fuel efficiency of today's vehicles, the driver's driving style is still a major factor in the efficiency of a particular vehicle. Aggressive driving, involving fast acceleration and deceleration, can greatly diminish the fuel efficiency of even today's most efficient vehicles.

When accelerating, the vehicle consumes excess fuel (or, in the case of an electrically-powered vehicle, electrical energy). Because vehicle engines are not perfectly efficient, the energy provided by this additional fuel is not fully utilized to accelerate the vehicle. A large portion of the energy is lost in the form of heat. In addition, when accelerating, the vehicle must overcome a number of forces and/or losses, such as inertia, rolling resistance, aerodynamic drag, and the like, which all cause reductions in the vehicle's efficiency.

Having accelerated, a driver often slows the vehicle by applying the vehicle's brakes. In most cases, this involves utilizing braking systems to convert the vehicle's inertia into heat. Although braking does not actively consume fuel, any time the vehicle's brakes are engaged, the vehicle's inertia is reduced. As discussed above, it can require a significant amount of fuel to accelerate a vehicle, and, therefore, gain inertia. As such, the act of braking is, in fact, very wasteful. Braking simply converts the vehicle's valuable inertia into heat. This is a direct waste of energy.

Instead of active braking, the most efficient way to stop a vehicle is by allowing the vehicle to coast to a stop. This approach, instead of converting the vehicle's inertia into wasted heat, converts the vehicle's inertia into a distance traveled (somewhat reduced by rolling resistance and drag) making maximal use of the vehicle's inertia.

Most drivers, though, are not familiar with coasting, do not use the technique, and, therefore, are not proficient at estimating the distance a vehicle travels before coasting to a stop. As a result, even for a driver that wishes to use the technique, upon approaching a stop sign, stop light, or other location at which the driver wishes to stop, the driver likely misjudged the vehicle's coasting distance and needed to apply the brake (or the accelerator) in order to bring the vehicle to a stop at the desired location.

Accordingly, there is a need for a system and method to assist a vehicle operator to become proficient at coasting (or, at least, increasing an amount of coasting utilized to slow a vehicle) and thereby maximize the technique's usage in order to optimize a fuel efficiency of the operator's vehicle.

SUMMARY

The disclosure relates in general to a feedback system and method for a vehicle operator and, more particularly, to a vehicle user interface providing vehicle operator feedback to assist in developing and maintaining energy-efficient braking habits.

In one implementation, the present disclosure is a method of providing feedback to an operator of a vehicle. The method includes detecting a release of an accelerator pedal of the vehicle, monitoring a distance traveled by the vehicle between the time the release of the accelerator pedal is detected and the vehicle reaches a stop, and determining the distance traveled and a speed of the vehicle at the time the release of the accelerator pedal is detected to calculate a point score. The method includes displaying the point score for review by the operator of the vehicle.

In another implementation, the present disclosure is a system for providing feedback to an operator of a vehicle. The system includes a pedal sensor configured to detect a position of an accelerator pedal of the vehicle, a movement sensor configured to detect a movement of the vehicle, and a controller. The controller is configured to detect a release of an accelerator pedal of the vehicle through the pedal sensor, monitor a distance traveled by the vehicle between the time the release of the accelerator pedal is detected and the vehicle reaches a stop through the movement sensor, and determine a point score through the distance traveled and a speed of the vehicle at the time the release of the accelerator pedal is detected. The system includes a display configured to output the point score for review by the operator of the vehicle.

In another implementation, the present disclosure is a system for providing feedback to an operator of a vehicle. The system includes a movement sensor configured to detect an acceleration of the vehicle, and a controller. The controller is configured to monitor a rate of deceleration of the vehicle between the time a release of an accelerator pedal is detected and the vehicle reaches a stop through the movement sensor, and determine a point score through the rate of deceleration. The system includes a display configured to output the point score for review by the operator of the vehicle.

DETAILED DESCRIPTION OF THE DRAWINGS

The disclosure relates in general to a feedback system and method for a vehicle operator and, more particularly, to a vehicle user interface providing vehicle operator feedback to assist in developing and maintaining energy-efficient braking habits.

The present system and method is presented in several varying embodiments in the following description with reference to the Figures, in which like numbers represent the same or similar elements. References throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the system. The system and method may both be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method.

Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present system and method provides feedback to a vehicle operator to assist the operator in maximizing coasting as a technique for stopping or slowing a vehicle. Coasting involves operating the vehicle by allowing the vehicle to roll to a stop without providing any forward propulsion and minimally applying the vehicle's brakes. Coasting, therefore, is a generally passive activity that does not consume additional fuel (the vehicle's engine is only idling) and does not waste energy by using the vehicle's brakes (that convert the vehicle's momentum into wasted heat).

Good coasting technique enables a vehicle operator to increase the distance traveled by a vehicle between the time the vehicle operator releases the vehicle's accelerator and the vehicle reaches a complete stop. This distance may be referred to as the Zero Consumption Running Distance (ZCRD). The greater the ZCRD for a given stop, the more efficient the stop. The ZCRD for a particular stop, therefore, can be determined by a combination of the vehicle's minimum rate of deceleration when coasting, as well as the vehicle's speed when a stop is initiated.

The system monitors the operator's behavior and provides useful information via a suitable display device describing the operator's coasting behavior. By providing the operator constant feedback, the operator can modify his or her behavior to achieve optimal coasting technique.

In one implementation, the system provides the user with a notification regarding the user's average coasting distance over a given number of stopping activities. The "coasting distance" is defined as the distance traveled by the vehicle between the time the operator stops applying the accelerator to the time the vehicle stops. In order to maximize coasting (and, thereby, improve the vehicle's fuel efficiency), the driver attempts to increase the average coasting distance. By increasing the average coasting distance, with each stop an increased amount of the vehicle's inertia is being converted into distance traveled rather than being wasted through active braking. The coasting distance is a metric that can be readily utilized by a vehicle operator. Distance is easier to gauge, for example, than deceleration. As a result, by providing the operator with a goal distance to travel during a stopping activity, rather than a goal deceleration, the present system provides straight-forward feedback that is relatively simple for a vehicle operator to utilize.

Figure 1:
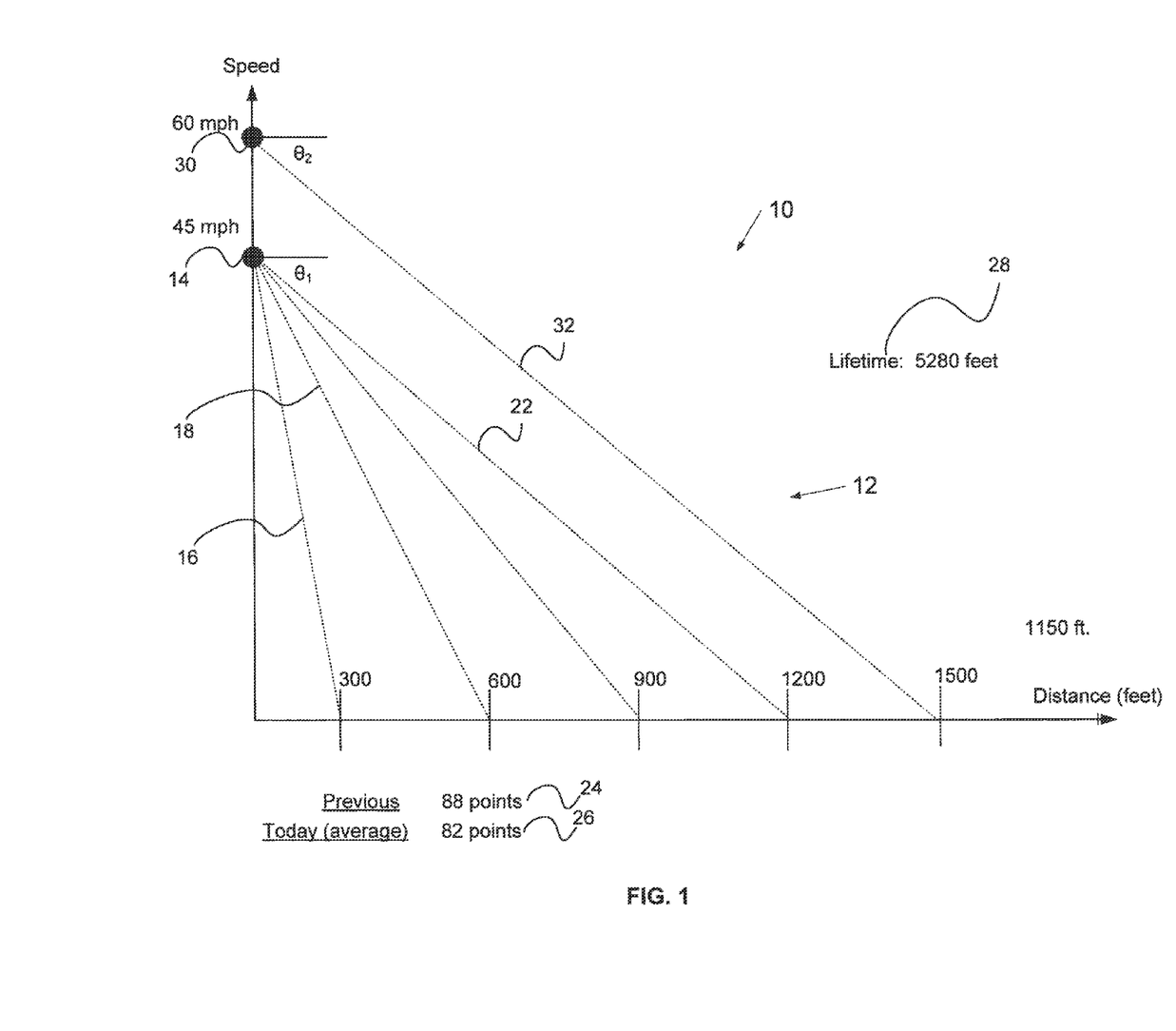
FIG. 1 is an illustration of an example user interface that may be displayed to provide feedback to a vehicle operator regarding braking activities.

FIG. 1 is an illustration of an example user interface that may be displayed in accordance with the present disclosure. The display 10 may be provided, for example, through any appropriate vehicle display system, such as one mounted into the vehicle's dashboard or center console. Alternatively, the display 10 could be provided through a mobile electronic device carried by the driver and paired with the vehicle using, for example, Bluetooth.

During normal driving operations, display 10 is not displayed (and does not, therefore, distract the driver). However, after the operator removes his or her foot from the vehicle accelerator and the vehicle reaches a complete stop, display 10 is provided. In some implementations, though, display 10 may be outputted while the vehicle is slowing during a braking activity. In that case, the output of display 10 can serve as a reminder to the driver to slow the vehicle in a controlled and fuel-efficient manner. Display 10 includes a first graph 12. Graph 12 includes a vertical axis depicting the vehicle's speed and the horizontal axis depicts the vehicle's stopping distance. Point 14 on the vertical axis indicates the vehicle's speed at the time the vehicle's accelerator pedal was released by the operator lifting his or her foot therefrom (in this case, 45 miles per hour (mph)). A number of different lines 16, 18, 20, and 22 illustrate different stopping approaches for the vehicle. Each of lines 16, 18, 20, and 22 demonstrate different stopping rates utilizing different amounts of active braking. As such, each of lines 16, 18, 20, and 22 represent different stopping efficiencies for the vehicle. Line 22 shows the most efficient stopping routine for the vehicle, which involves allowing the vehicle to coast until the vehicle achieves a complete stop.

Generally, the more efficient a stop, the greater the distance traveled by the vehicle. Accordingly, the slope of the various lines 16, 18, 20, and 22 (angle $\theta_1$), indicates the efficiency of a particular stop. The smaller the angle (and, correspondingly, the closer the slope of the line is to zero), the more efficient the stop.

Given this relationship, stops at greater speeds cover a greater distance. For example, point 30 on the vertical axis of graph 12 indicates a vehicle speed of 60 mph at the time the vehicle's accelerator pedal was released. With that increased initial speed, the stop takes a greater distance to complete efficiently (approximately 1,500 feet for 60 mph, versus 1,200 feet for 45 mph). The efficiency of the stop indicated by line 32 can be evaluated by analyzing the angle $\theta_2$, which, as described above, indicates the slope of line 32 and thereby an efficiency of the stop.

After the operator has completed a stop, the rate of deceleration is added as a line on graph 12 to allow the operator to gauge how fuel-efficient that particular stop was. The more vertical the line, the more aggressive the stop as a more vertical line indicates more rapid deceleration. As such, a line that is more horizontal (e.g., line 22) indicates a more controlled stop with less rapid deceleration and, therefore, higher efficiency.

In addition to providing information regarding the operator's current vehicle stopping activity, display 10 provides information regarding the operator's historical stopping activities. Specifically, display 10 provides a number of scores indicating how fuel efficient the operator's previous vehicle stops have been.

In the example provided in FIG. 1, display 10 shows the operator's stopping score for the previous stopping event (24) and an average score for today's activities (26). In some instances, display 10 also depicts the lifetime stopping distance for the vehicle (28) or, alternatively, the cumulative stopping distance for the vehicle over a different time frame.

Figure 2:
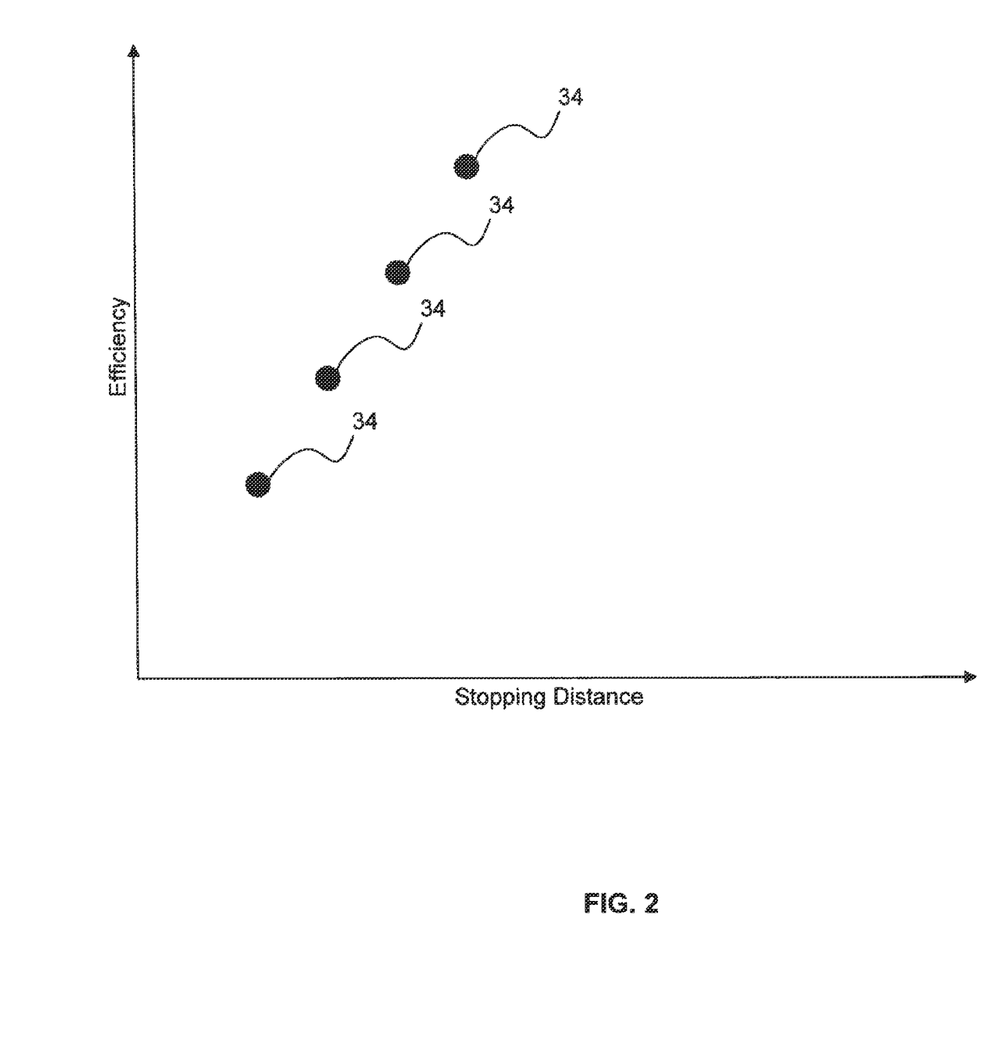
FIG. 2 is a graph comparing a vehicle's efficiency to a given stopping distance.

In some implementations, the display may also output a graph that depicts the mapping of the vehicle's efficiency to stopping distance. FIG. 2 depicts such a graph comparing the vehicle's efficiency to a given stopping distance. Depending upon the system implementation, the graph of FIG. 2 may be displayed in conjunction with the display depicted in FIG. 1 or separately.

In FIG. 2, the graph includes a vertical axis indicating efficiency and a horizontal axis indicating stopping distance. A number of points 34 depict the efficiency for a number of given stopping distances. These efficiency points 34 may be determined, for example, based upon the current speed of the vehicle.

In various implementations, different displays can be utilized to provide the vehicle operator with feedback regarding the vehicle stopping efficiency. For example, the display could include an animation showing a character (representing the operator) surpassing a particular obstacle or falling short, depending upon the efficiency of the vehicle stop.

One example involves the depiction of a hang glider character jumping from a cliff. The height of the cliff may be determined by the speed of the vehicle when the stopping process began. The hang glider character may be animated jumping from the cliff. The path the character takes to reach the ground may be determined by the deceleration of the vehicle during the stopping process. If the vehicle successfully coasted for a majority of the stopping distance (resulting in a relatively fuel-efficient stopping process) and, as a result sufficient points were awarded for the stop, the character may fly past a particular obstacle, such as a flag or a hill. If, however, the stop was very aggressive (involving a relatively large amount of active braking), the character may not pass the obstacle. In such a case, the path of the hang glider character provides useful feedback to the operator regarding how abruptly the vehicle was stopped. Additionally, the path of the glider teaches the vehicle operator that a lot of speed is lost at the beginning of the stopping process when using the coasting technique.

Figure 3:
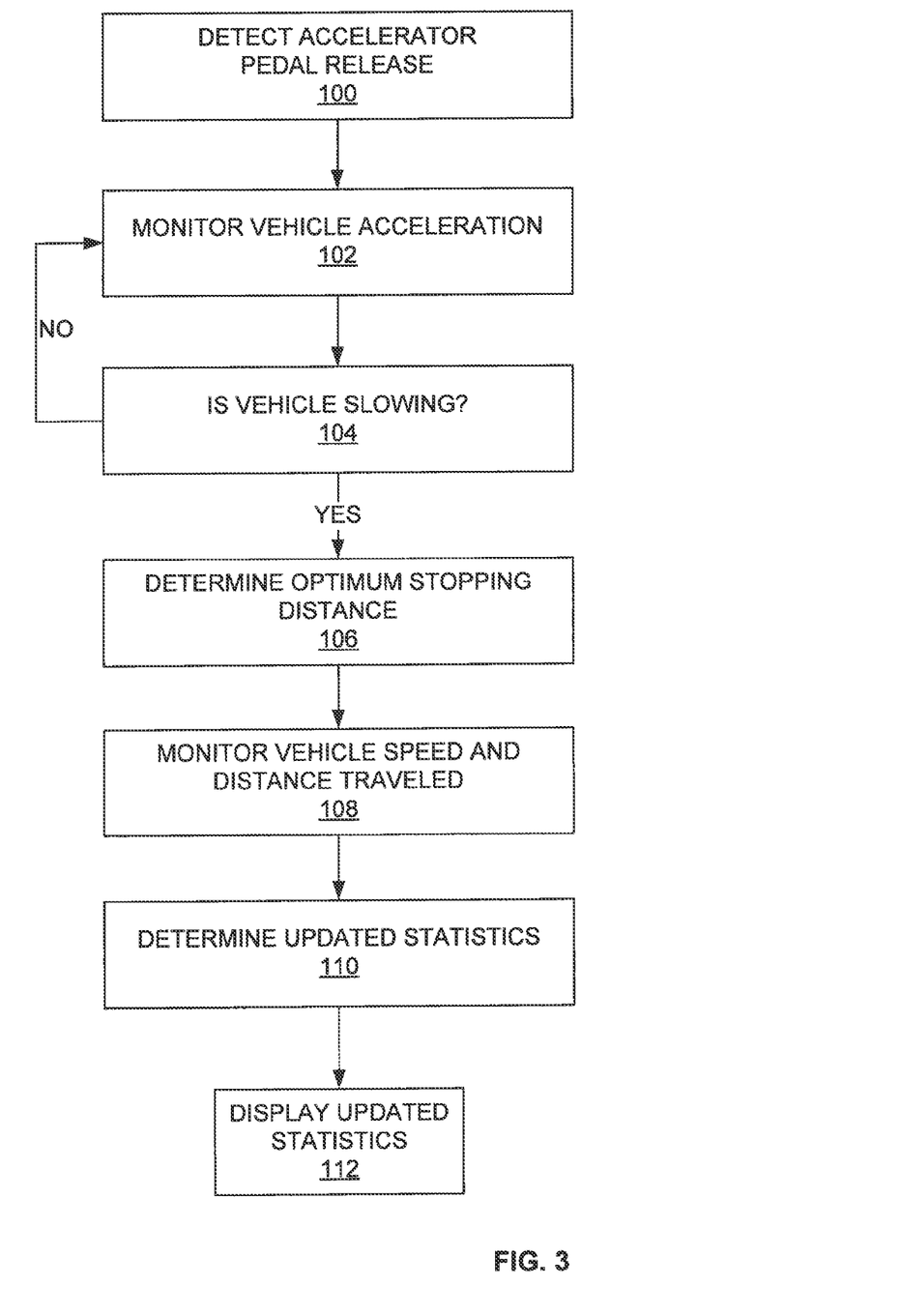
FIG. 3 is a flowchart illustrating an exemplary method to provide feedback to an operator of a vehicle to assist in developing and maintaining energy-efficient vehicle stopping habits.

FIG. 3 is a flowchart illustrating an exemplary method to provide feedback to an operator of a vehicle to assist in developing and maintaining energy-efficient vehicle stopping habits. In 100, the method detects that the vehicle's accelerator pedal has been released. This may indicate that the operator wishes to stop the vehicle, or, possibly, that the operator does not wish to stop the vehicle, but simply slow down. In some cases, the operator may release the accelerator pedal when the vehicle is traveling downhill to prevent the vehicle from gaining too much speed.

The detection of a release of the vehicle's accelerator pedal can be made, for example, by detecting a position of the accelerator pedal using a potentiometer, optical sensor, or other device suitable for detecting a position of the pedal. In some cases, 100 includes determining whether the vehicle is also engaged in a cruise control operation. In that case, even if the vehicle operator releases the vehicle's acceleration pedal, if the vehicle is engaged in cruise control mode, it is presumed that the vehicle operator is not attempting to stop the vehicle. As such, the method would not be executed if cruise control mode is detected and would instead exit. In electronically-controlled vehicles, 100 may include determining that an accelerometer of the vehicle has been disengaged by the release of a button, lever, or other user interface that controls the vehicle's acceleration or the disabling of cruise control). Alternatively, 100 may include detecting that the vehicle operator has tapped upon the vehicle's brakes to indicate that a vehicle stop has been initiated.

After accelerator pedal release has been detected, in 102 the vehicle's acceleration is monitored. There are a number of ways to monitor the vehicle's acceleration including using a vehicle speed pulse sensor to monitor the vehicle's speed (and determine whether the speed is reducing, indicating that the vehicle is decelerating). Similarly, a distance sensor (such as the vehicle's odometer) can be utilized to measure how far the vehicle travels over a given time period. If, over subsequent time periods (e.g., 1 second periods), the distance traveled for a given time period is reduced, that indicates the vehicle is slowing. Alternatively, geo-location sensors, such as global positioning system (GPS) sensors and the like, can be used to monitor the vehicle's velocity. That velocity can be analyzed over time to determine whether the vehicle is slowing. The vehicle's deceleration could also be monitored by the use of an accelerometer installed into the vehicle. The vehicle's speedometer could also be utilized to determine a rate of deceleration of the vehicle.

If the vehicle is not slowing, as determined in 104, the method continues to monitor the vehicle's speed to determine whether the vehicle is slowing. In some cases, as mentioned above, the vehicle operator may release the acceleration pedal, but the vehicle does not slow down (e.g., in the case that the vehicle is traveling downhill). In that situation, the system can continue to monitor vehicle acceleration to determine whether the vehicle comes to a complete halt. If it detected that the operator has re-engaged the accelerator pedal, the method can enter a general end state or reset state and wait until the system detects that the operator has released the accelerator pedal.

In situations where the operator releases the vehicle's accelerator pedal, but the vehicle accelerates (perhaps because the vehicle is traveling downhill), the system may be configured to compensate for the increased coasting distance to ensure that the operator's stopping statistics are not artificially inflated by the gains in efficiency made by rolling downhill. In such an implementation, the system may be configured to ignore any cruising distance accumulated while the vehicle is traveling at a speed faster than that of the vehicle when the accelerator pedal release was first detected. As such, distance gained as a result of traveling downhill can be ignored. Alternatively, however, distance gained while traveling downhill may be included into the operator's statistics as the use of downhill portions of roadways to increase coasting distance can be a fuel-efficient driving technique that can be rewarded using the present system.

Upon determining that the vehicle is slowing, in an optional step, the vehicle's current speed is analyzed in 106 to determine an optimum vehicle stopping distance. This can be the optimum distance in which the vehicle may stop and achieve a relatively high efficiency (e.g., the ZCRD). In many cases, the distance is equal to the distance required for the vehicle to coast to a stop (with no active braking), though in some cases the optimum distance allows for some active braking.

The optimum distance is determined based upon the current speed of the vehicle and other attributes of the vehicle including the vehicle's rolling resistance, general drag coefficient, engine braking attributes (which may include whether the vehicle is engaged in a 'tow mode'), and the like.

Having determined the vehicle's optimum stopping distance in 106, the optimum stopping distance may be displayed for the operator. In one implementation, the display includes one or more of the features shown in FIG. 1 and FIG. 2. The operator can then use the displayed optimum stopping distance to control how the vehicle stops—this may involve allowing the vehicle to coast for a certain distance, or lightly applying the vehicle's brakes.

While the vehicle executes the stopping process, in 108 the vehicle speed and distance traveled are continuously monitored. Again, this may be performed using a vehicle speed pulse sensor to monitor the vehicle's speed and determine the distance traveled by the vehicle and the time taken to stop. Similarly, a distance sensor (such as the vehicle's odometer) can be utilized to measure how far the vehicle travels before it comes to a stop. If, over subsequent time periods (e.g., 1 second periods), the distance traveled is measured, it is also possible to calculate the vehicle acceleration while the vehicle comes to a stop. Alternatively, geo-location sensors, such as GPS sensors and the like, can be used to monitor the vehicle's velocity as the vehicle comes to a stop.

In 110, after monitoring the vehicle's movements as it comes to a stop, updated stopping statistics are determined for the vehicle. This step may involve, for the current stopping activity, determining a point score that may then be displayed for the operator (e.g., using the display of FIG. 1). The point score is allocated based upon the vehicle's coasting distance for the current stop. In various implementations, however, the point score is normalized for the vehicle's starting speed. If the scores were not normalized for speed, a single stop from a vehicle high speed (such as when exiting a high-speed freeway) that may occur over a very long distance, could earn a very high score, even if the stop is not particularly efficient.

In one implementation of the present system, the median score awarded by the system is approximately 50. In such a system, the median score would be awarded for a stop that exhibited an average deceleration of approximately 0.2 meters per second per second (m/s$^2$).

In addition to calculating a score for the present stop, the method may include calculating statistics for a large number of stops. For example, the system can calculate an average score for stops performed today, stops performed over the lifetime of the vehicle, stops performed over another time frame, and the like.

Additionally, comparisons can be made between the actual distance traveled by the vehicle during the stop activity and the optimal coasting distance for the vehicle. That comparison can then be used to determine a fuel efficiency score for the stopping activity.

Figure 4:
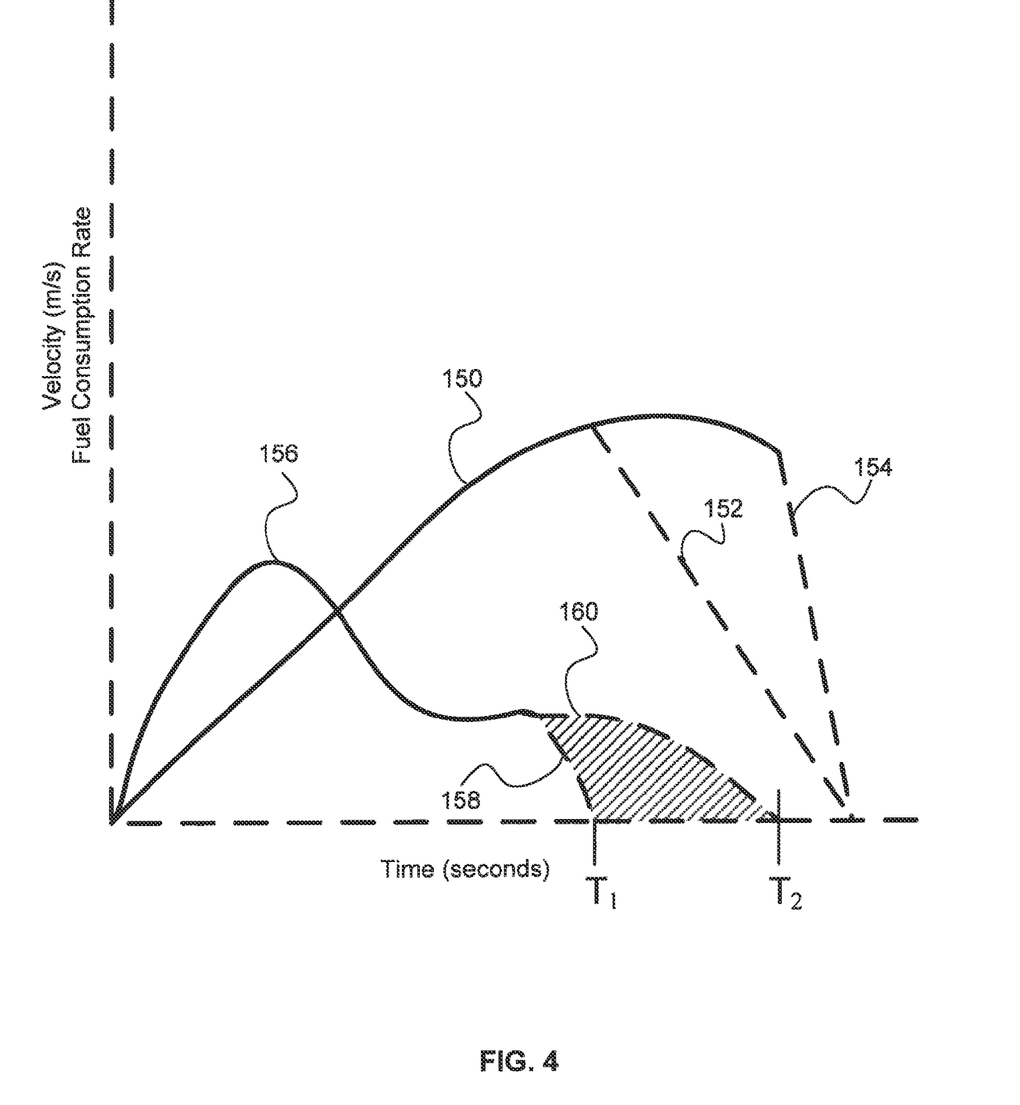
FIG. 4 is a graph depicting fuel consumption of a vehicle and a velocity of the vehicle during two example stopping activities, where one of the stopping activities is more efficient than the other.

FIG. 4 is a graph depicting fuel consumption of a vehicle and a velocity of the vehicle during two example stopping activities, where one of the stopping activities is more efficient than the other. In FIG. 4, the vertical axis of the graph represents the velocity of the vehicle (for the velocity curves) and a rate of fuel consumption (for the fuel consumption curves). The horizontal axis represents time.

Curve 150 represents the vehicle's velocity as the vehicle accelerates to a cruising velocity. After the vehicle has reached cruising velocity, curves 152 and 154 represent two different stopping activities. The first stopping activity begins at time $T_1$ and the second stopping activity begins at time $T_2$, sometime later. The deceleration of the vehicle during the first stopping activity (indicated by the slope of curve 152) has a lower magnitude (and is, therefore, more efficient) than that of the second stopping activity (indicated by the slope of curve 154). The differing efficiency of the two stops is illustrated by the fuel consumption curves.

Curve 156 represents a rate of fuel consumption by the vehicle while the vehicle is accelerating to a cruising velocity. Curve 158 represents the rate of fuel consumption of the vehicle through the first stopping activity (correlating to curve 152) and curve 160 represents the rate of fuel consumption of the vehicle through the second stopping activity (correlating to curve 154).

As seen in FIG. 4, by waiting to initiate the stop until time $T_2$, the second stopping activity results in the consumption of additional resources (indicated by the shaded region below curve 160). By delaying the stop activity, the vehicle operator is required to brake harder in order to stop the vehicle at the desired location, resulting in an unnecessary consumption of resources and a less-efficient stop. With reference to FIG. 4, that delay, therefore, results in a steeper deceleration curve 154, which, as described above, indicates a less efficient stop.

In some implementations, the system attempts to identify an operator of the vehicle (for example by identifying a key fob currently being used to operate the vehicle). Based upon that identification, the system can then calculate stop statistics for that particular operator, rather than all the vehicle operators in combination.

Additional statistics may include the total distance of all stops made by the vehicle, current efficiency of vehicle stops, and the like.

Once determined, the updated statistics are displayed for a user in step 112.

Figure 5:
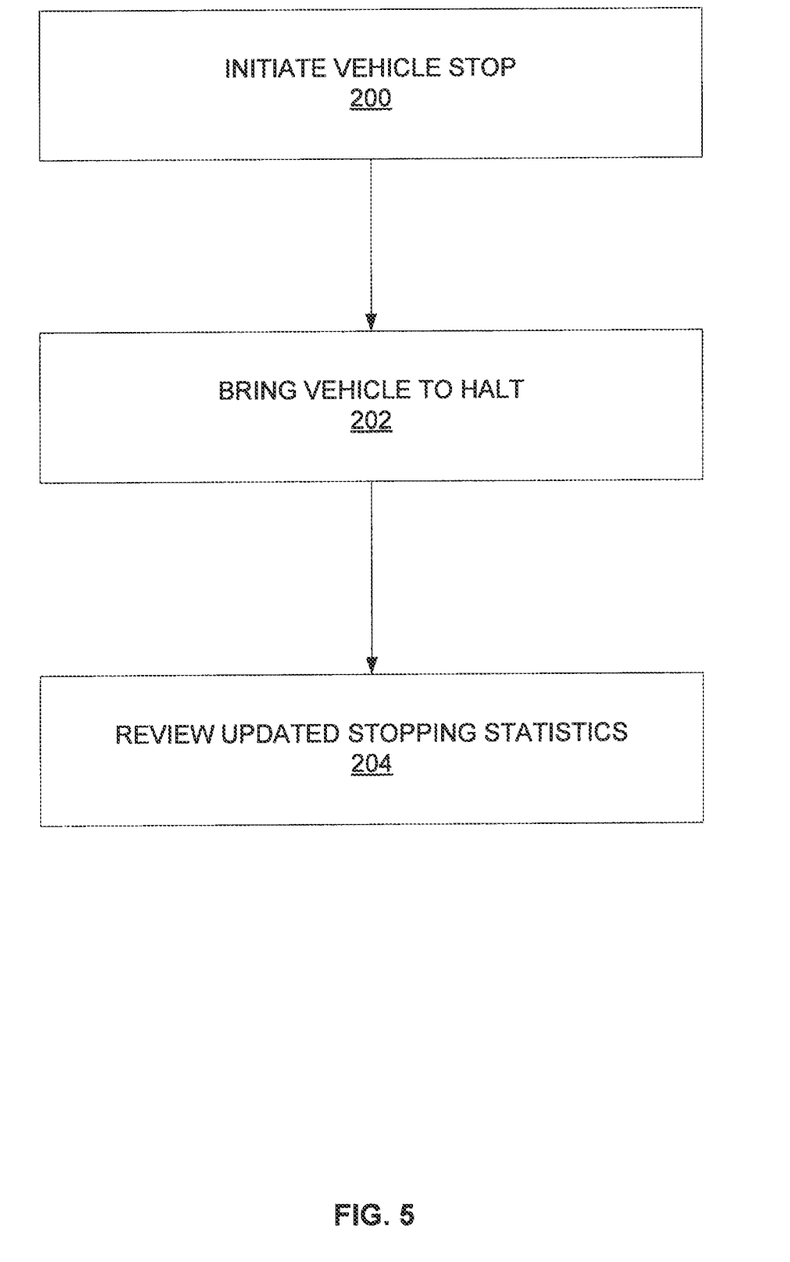
FIG. 5 is a flowchart illustrating an example use case for the present system wherein a vehicle operator brings the vehicle to a stop.

Using the present system, FIG. 5 is a flowchart illustrating an example use case for the present system wherein a vehicle operator brings the vehicle to a stop. In step 200, a vehicle operator initiates a stop. This involves the operator releasing the vehicle's accelerator pedal and allowing the vehicle to begin slowing. As discussed above with respect to the method of FIG. 3, at this point the system detects that a vehicle stop has been initiated.

With the stopping process initiated, the system may, optionally, display an optimum stopping distance, based upon the vehicle's speed when the stop was initiated. Accordingly, if the optimum stopping distance is displayed, the operator can review the optimum stopping distance information (displayed, for example using a display such as that of FIG. 1 and/or FIG. 2). This allows the operator to attempt to bring the vehicle to a stop in conformance with the depicted optimum stopping distance. This step, however, is optional as the present system may be configured to only display stopping statistics when the vehicle has come to a complete halt.

After initiating the stop, in step 202 the operator brings the vehicle to a halt. This may involve allowing the vehicle to coast for a particular distance and, sometimes, applying the vehicle's brakes. The degree to which the operator actively brakes the vehicle while bringing the vehicle to a complete stop can affect the efficiency (and score) of the stop.

After the vehicle is stopped, in step 204 updated statistics for the operator's stops are displayed. The statistics may include a point score for the current stop, a point score averaged over multiple stops, and the like.

Figure 6:
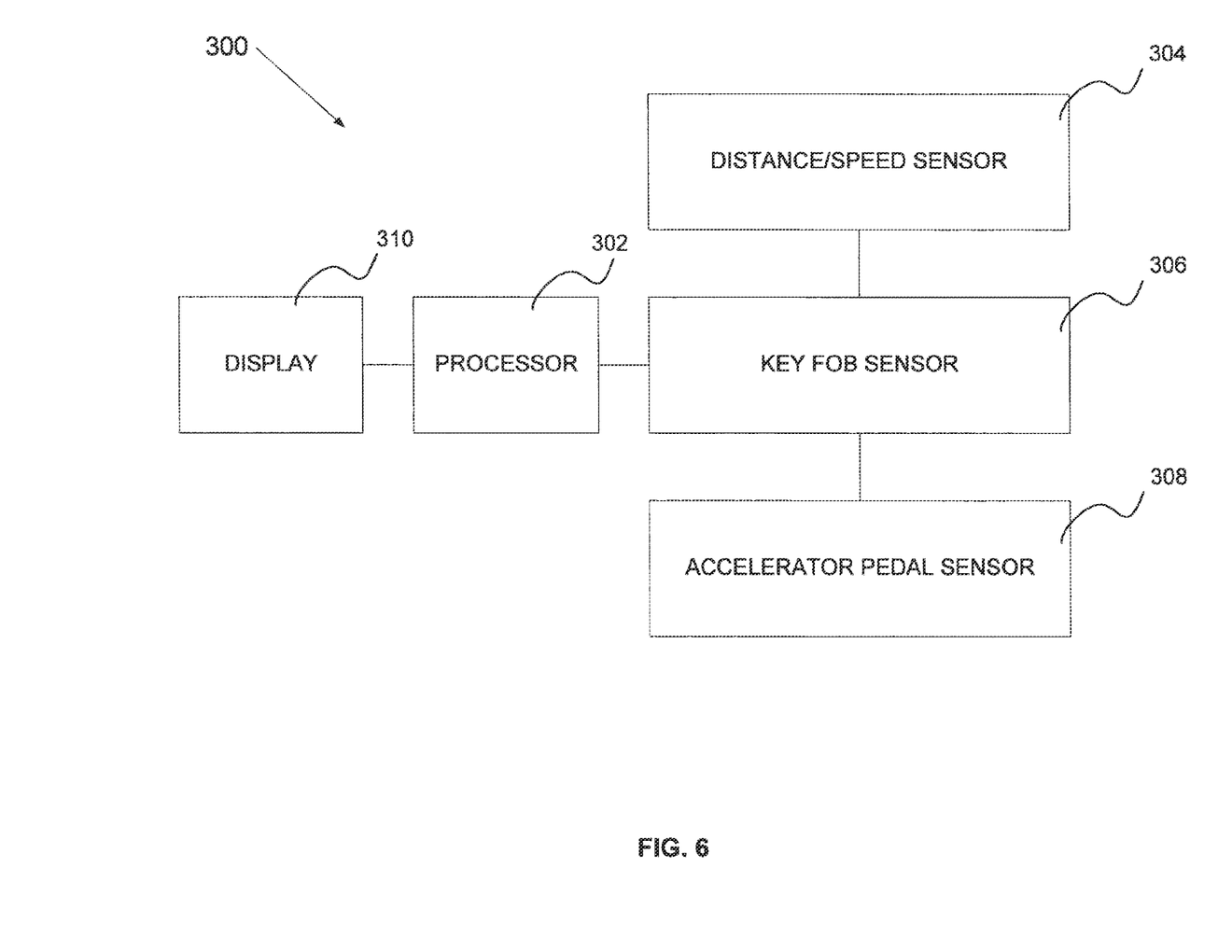
FIG. 6 is a block diagram of a system configured to provide feedback to an operator of a vehicle to assist in developing and maintaining energy-efficient vehicle stopping habits.

FIG. 6 is a block diagram of a system configured to provide feedback to an operator of a vehicle to assist in developing and maintaining energy-efficient vehicle stopping habits.

System 300 includes processor 302. Processor 302 may include a processor operating in the vehicle, or a processor associated with a separate mobile device, for example. The processor is configured to execute a method, such as the method of FIG. 3) to provide a vehicle operator with continuous feedback regarding the operator's vehicle stopping activities.

Processor 302 is in communication with a number of sensors that enable processor 302 to capture data regarding the movement of the vehicle and other information used in executing the present method.

For example, processor 302 is in communication with a vehicle distance or speed sensor 304. Sensor 304 is configured to monitor a movement of the vehicle during the stopping process. Using sensor 304, processor 302 can determine a distance traveled by the vehicle during the stopping processes as well as the acceleration (or speed) of the vehicle during that process. Sensor 302 may include a vehicle speed pulse sensor, location sensing sensor (e.g., GPS sensor), distance sensor, or the like. By using sensor 304 to measure either acceleration, speed, or distance over time (or combinations thereof), it is possible for processor 302 to use common mathematical approaches (e.g., derivations and integrals) to calculate any of the distance, speed, or acceleration of the vehicle throughout the stopping processor.

Processor 302 is also in communication with key fob sensor 306. Key fob sensor 306 can be used to interact with (and receive an ID code from) a key fob that is present within the vehicle. In many cases, this key fob ID code can be used to uniquely identify the operator of the vehicle because in many cases the key fob is carried by the same individual at all times. With the operator uniquely identified, the system can then provide stopping statistics for that driver alone.

Processor 302 is in communication with acceleration pedal sensor 308 to detect when the operator has released the accelerator pedal. Sensor 308 may include a potentiometer, pressure sensor, or other device suitable for detecting a position of the accelerator pedal.

Processor 302 is in communication with display 310 for outputting information to the vehicle operator. The information provides feedback on the operator's prior stopping activities and helps coach the operator to stop the vehicle in a manner that is more efficient. As discussed above, display 310 may depict a target stopping distance for the vehicle, as well as output statistical information describing the operators stopping history.

In some implementations, the present system may be combined with a game approach that allows the vehicle operator to pass a number of stages based upon the operator's vehicle stopping technique. The game can be based on how well the operator manages the vehicle's stopping activity by maximizing vehicle coasting over active braking. Based upon a comparison of actual distance traveled during a stop and an optimal coasting distance, a score is produced. As such, the score is based on how well the operator takes into account vehicle fuel efficiency by releasing the accelerator pedal and achieving a greatest coasting distance without active braking. After a number of points are achieved, a stage is cleared. Bad braking does not warrant any points and may, in some case, call for the removal of points. Points become more difficult to get as the game progresses. Depending on the number of points acquired by the vehicle operator, stages can be passed or introduced. By passing or completing different stages, the user can unlock new stages.

Although the present invention has been described with respect to preferred embodiment(s), changes may be made in form and detail, and equivalents may be substituted for elements of the invention without departing from the spirit and scope of the invention. Therefore, it is intended that the invention not be limited to the particular embodiments disclosed for carrying out this invention, but will include all embodiments falling within the scope of the appended claims.

What is claimed is:

1. A method of providing feedback to an operator of a vehicle, comprising:
   detecting a release of an accelerator pedal of the vehicle;
   monitoring a distance traveled by the vehicle between the time the release of the accelerator pedal is detected and the vehicle reaches a stop;
   determining the distance traveled and a speed of the vehicle at the time the release of the accelerator pedal is detected to calculate a point score; and
   displaying the point score for review by the operator of the vehicle.

2. The method of claim 1, comprising, after detecting the release of the accelerator pedal, determining that the vehicle is stopping by monitoring an acceleration of the vehicle.

3. The method of claim 2, wherein the acceleration of the vehicle is monitored through a vehicle speed pulse sensor.

4. The method of claim 2, wherein the acceleration of the vehicle is monitored through a global positioning system (GPS) sensor.

5. The method of claim 1, wherein the point score indicates a fuel-efficiency of the vehicle between the time the release of the accelerator pedal is detected and the vehicle reaches a stop.

6. The method of claim 1, including displaying statistical data describing a previous point score.

7. The method of claim 1, including detecting a key fob to identify the operator of the vehicle.

8. The method of claim 1, wherein detecting the release of the accelerator pedal of the vehicle includes detecting a disabling of a cruise control of the vehicle.

9. A system for providing feedback to an operator of a vehicle, comprising:
   a pedal sensor configured to detect a position of an accelerator pedal of the vehicle;
   a movement sensor configured to detect a movement of the vehicle;
   a controller configured to:
      detect a release of an accelerator pedal of the vehicle through the pedal sensor,
      monitor a distance traveled by the vehicle between the time the release of the accelerator pedal is detected and the vehicle reaches a stop through the movement sensor, and
      determine a point score through the distance traveled and a speed of the vehicle at the time the release of the accelerator pedal is detected; and
   a display configured to output the point score for review by the operator of the vehicle.

10. The system of claim 9, wherein the processor is configured to, after detecting the release of the accelerator pedal, determine that the vehicle is stopping by monitoring an acceleration of the vehicle.

11. The system of claim 9, wherein the movement sensor is a vehicle speed pulse sensor.

12. The system of claim 9, wherein the movement sensor is a global positioning system (GPS) sensor.

13. The system of claim 9, wherein the point score indicates a fuel-efficiency of the vehicle between the time the release of the accelerator pedal is detected and the vehicle reaches a stop.

14. The system of claim 9, wherein the controller is configured to calculate statistical data describing a previous point score.

15. The system of claim 9, wherein the controller is configured to detect a key fob to identify the operator of the vehicle.

16. The system of claim 9, wherein the pedal sensor includes a potentiometer.

17. A system for providing feedback to an operator of a vehicle, comprising:
- a movement sensor configured to detect an acceleration of the vehicle;
- a controller configured to:
  - monitor a rate of deceleration of the vehicle between the time a release of an accelerator pedal is detected and the vehicle reaches a stop through the movement sensor, and
  - determine a point score through the rate of deceleration; and
- a display configured to output the point score for review by the operator of the vehicle.

18. The system of claim 17, wherein the movement sensor is a vehicle speed pulse sensor.

19. The system of claim 17, wherein the controller is configured to calculate statistical data describing a previous point score.

20. The system of claim 17, wherein the controller is configured to detect a key fob to identify the operator of the vehicle.

* * * * *